US012692987B2

(12) United States Patent
Baer et al.

(10) Patent No.: US 12,692,987 B2
(45) Date of Patent: Jul. 28, 2026

(54) PRESSURE VESSEL ASSEMBLY AND MOTOR VEHICLE

(71) Applicant: Bayerische Motoren Werke Aktiengesellschaft, Munich (DE)

(72) Inventors: Daniel Baer, Garching (DE); Timo Gutmann, Bad Kohlgrub (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 358 days.

(21) Appl. No.: 18/682,483

(22) PCT Filed: Aug. 17, 2022

(86) PCT No.: PCT/EP2022/072948
§ 371 (c)(1),
(2) Date: Feb. 9, 2024

(87) PCT Pub. No.: WO2023/021083
PCT Pub. Date: Feb. 23, 2023

(65) Prior Publication Data
US 2024/0344667 A1 Oct. 17, 2024

(30) Foreign Application Priority Data
Aug. 19, 2021 (DE) ..................... 10 2021 121 526.9

(51) Int. Cl.
*F17C 13/08* (2006.01)
*B60K 15/07* (2006.01)
*B60K 15/063* (2006.01)

(52) U.S. Cl.
CPC ............ *F17C 13/084* (2013.01); *B60K 15/07* (2013.01); *B60K 2015/0634* (2013.01); *F17C 2205/0192* (2013.01); *F17C 2270/0168* (2013.01)

(58) Field of Classification Search
CPC ............ F17C 13/084; F17C 2205/0192; F17C 2270/0168; B60K 15/07; B60K 2015/0634
See application file for complete search history.

(56) References Cited

U.S. PATENT DOCUMENTS 6,766,911 B2 * 7/2004 Higgins .................. A47F 7/285
211/74
10,538,159 B2 * 1/2020 Kataoka ........... B60K 15/03519
(Continued)

FOREIGN PATENT DOCUMENTS

CN 109084171 A 12/2018
DE 10 2013 110 203 A1 3/2015
(Continued)

OTHER PUBLICATIONS

International Search Report (PCT/ISA/210) issued in PCT Application No. PCT/EP2022/072948 dated Dec. 15, 2022 with English translation (6 pages).
(Continued)

*Primary Examiner* — Valentin Neacsu
*Assistant Examiner* — Michael R Stabley
(74) *Attorney, Agent, or Firm* — Crowell & Moring LLP

(57) ABSTRACT

A pressure vessel assembly in which flat portions of longitudinal ends of the pressure vessels are held in parallel to securing rails, such that limited mobility of the longitudinal ends is made possible. A motor vehicle may comprise a pressure vessel assembly of this kind.

21 Claims, 3 Drawing Sheets

(56) References Cited

U.S. PATENT DOCUMENTS

| | | | | |
|---|---|---|---|---|
| 10,717,356 | B2 * | 7/2020 | Kataoka | B60K 15/07 |
| 11,447,005 | B2 * | 9/2022 | Sawai | B60K 15/07 |
| 11,485,223 | B2 * | 11/2022 | Sawai | B60K 15/07 |
| 12,427,857 | B2 * | 9/2025 | Stahl | B60K 15/07 |
| 2019/0047411 | A1 * | 2/2019 | Kataoka | B60K 15/07 |
| 2019/0047633 | A1 * | 2/2019 | Sawai | B62D 25/2072 |
| 2019/0291573 | A1 | 9/2019 | Banno et al. | |
| 2021/0237562 | A1 | 8/2021 | Sawai | |
| 2022/0396142 | A1 | 12/2022 | Stahl | |
| 2023/0008726 | A1 | 1/2023 | Stahl et al. | |
| 2023/0408040 | A1 * | 12/2023 | Gutmann | F17C 13/084 |
| 2024/0344667 | A1 * | 10/2024 | Baer | F17C 13/084 |

FOREIGN PATENT DOCUMENTS

| | | | |
|---|---|---|---|
| DE | 10 2017 006 715 | A1 | 1/2019 |
| DE | 10 2017 222 718 | A1 | 6/2019 |
| DE | 10 2019 130 030 | A1 | 5/2021 |
| DE | 10 2021 106 038 | A1 | 5/2021 |
| DE | 10 2019 134 120 | A1 | 6/2021 |
| JP | 2019-33657 | A | 2/2019 |
| KR | 10-2020-041674 | A | 4/2020 |
| WO | WO 2019/015885 | A1 | 1/2019 |

OTHER PUBLICATIONS

German-language Written Opinion (PCT/ISA/237) issued in PCT Application No. PCT/EP2022/072948 dated Dec. 15, 2022 with English translation (9 pages).

* cited by examiner

PRESSURE VESSEL ASSEMBLY AND MOTOR VEHICLE

BACKGROUND AND SUMMARY

The present disclosure relates to a pressure vessel assembly and a motor vehicle with a pressure vessel assembly.

Pressure vessel assemblies typically have one or more pressure vessels which can be used to store gaseous fuel. This can be, for example, natural gas or hydrogen. A requirement is increasingly made of pressure vessel assemblies that they can be installed in installation spaces which have been uncustomary up to now, such as, for example, underfloor spaces below the passenger cell of a motor vehicle, in order for it to be possible for them to be used in as many different vehicles as possible, for example even instead of an electrical battery store which is otherwise provided.

Document CN 109 084 171 A discloses a hydrogen storage device with a large hydrogen cylinder for a fuel cell vehicle.

It is one object of the present disclosure to decrease or to eliminate at least one disadvantage of a previously known solution, or to propose an alternative solution. In particular, it is one object to provide a pressure vessel assembly which exhibits improved resistance with respect to side impact events.

A pressure vessel assembly is described herein, comprising (i) one or more pressure vessels, (ii) one or more fastening rails, (iii) one or more bearing shells, and (iv) one or more centering elements. One, some, or all bearing shells are fastened to one or more fastening rails. One longitudinal end of one, some, or all pressure vessels has at least one flat portion and is held by a centering element in a bearing shell, with the result that the flat portion assumes an angle of at most 5° with respect to the fastening rail, to which the bearing shell is fastened. The centering element enables a limited relative movement of the longitudinal end of the pressure vessel relative to the fastening rail, at least parallel to the fastening rail.

In the case of the pressure vessel assembly as described above, there is a certain movability as a result of the centering elements, with the result that the pressure vessels also have a certain movability relative to the fastening rails. In the case of a side impact event which, for example, can bring about an action of force at least substantially parallel to the fastening rails, this makes it possible, for example, that the pressure vessels can yield as a result of the provided movability and can possibly also be supported against one another.

The fastening rails can be, in particular, longitudinally extending rails which can define, in particular, a longitudinal direction. In particular, a cross section can be constant or at least substantially constant in the longitudinal direction. The bearing shells can serve, in particular, to fasten the pressure vessels via the centering elements to the fastening rails. The bearing shells can have, in particular, at least approximately a rectangular shape, in particular as viewed from the side. The centering elements can fix, in particular, the position of the pressure vessels relative to the bearing shells, and in the process, as mentioned, can permit a certain relative movement. This does not necessarily have to mean that the pressure vessels are held in each case exactly in the center, but it can mean this.

A flat portion of a pressure vessel can define, in particular, the relation to a fastening rail in an improved manner in comparison with a round portion. In particular, a movability along the respective longitudinal direction can be defined in an improved manner as a result and can also be assisted in an improved manner. A flat portion can be configured, in particular, as a planar or at least largely planar surface.

Certain pressure vessel assemblies can fundamentally have only one pressure vessel, one fastening rail, one bearing shell and one centering element. There are in each case several of these elements typically present, however, it being possible, for example, for a plurality of pressure vessels to be arranged next to one another, in particular with parallel longitudinal axes. A pressure vessel assembly of this type can advantageously be installed, in particular, into an underfloor space of a motor vehicle.

A further flat portion which is parallel to the flat portion is configured at one, some, or each longitudinal end in an opposed manner with respect to the flat portion. As a result, stabilization can be achieved in an advantageous way on both sides, for example, at the top and at the bottom.

In accordance with one advantageous embodiment, one, some, or all bearing shells are divided into a first part and a second part. This facilitates an assembly of the pressure vessel assembly and also dismantling, for example, for the targeted removal of a pressure vessel for overhaul purposes.

A dividing line between a first part and a second part can be, in particular, parallel to the flat portion. This enables a simple and practicable construction.

Furthermore, one, some, or all centering elements can enable, in particular, a limited relative movement of the longitudinal element of the pressure vessel relative to the fastening rail transversely with respect to the fastening rail. This enables an additional limited movability, with the result that the relative movability is present not only in the longitudinal direction, but also transversely with respect thereto. This enables two-dimensionally movable mounting, with the result that, for example, a certain suspension is enabled with respect to vibrations, and a pressure which possibly acts, for example, on account of an impact event, can be yielded to in an improved manner. The movability transversely with respect to the fastening rail can be present, in particular, transversely with respect to the longitudinal direction of the pressure vessel. Whether a movability is also present in the longitudinal direction of the pressure vessel can be dependent, in particular, on whether this is a locating bearing or floating bearing.

One, some, or all centering elements are configured from an elastic material. This enables a simple realization of the abovementioned limited movability. The elastic material can be deformable from a certain pressure, this material returning into its starting state when the pressure ends.

One, some, or all centering elements can have, in particular, one or more predetermined break points for enabling the relative movement. Here, in particular, an irreversible deformation of the centering elements can be provided, with the result that the predetermined break points fracture for the case of a pressure which acts, the relative movement is enabled as a result, and no automatic return into the starting state is provided. As a result, for example, for the case of an impact event, after which an overhaul of the pressure vessel assembly is typically in any case required, a resilience can be provided.

One, some, or all centering elements can hold, in particular, the flat portion parallel to the fastening rail. As a result, in particular, a simple embodiment can be achieved which enables an advantageous movability along the longitudinal direction.

In accordance with one advantageous embodiment, one, some or all bearing shells are fastened via one, two, or more screwed bolts to one, two, or more fastening rails. In particular, all bearing shells can be fastened via in each case two screwed bolts to in each case two fastening rails, two fastening rails typically being parallel to one another and a plurality of bearing shells being fastened to the two fastening rails. Two fastening rails are typically provided at each longitudinal end of adjacent pressure vessels.

In particular, an upper first fastening rail can be arranged above first longitudinal ends of the pressure vessels, and, in particular, a lower first fastening rail can be arranged below the first longitudinal ends of the pressure vessels, the bearing shells for holding the first longitudinal ends being fastened both to the upper first fastening rail and to the lower first fastening rail. As a result, first longitudinal ends which can be arranged, for example, adjacently with respect to one another can be fastened in an advantageous and simple way via the two first fastening rails. The fastening rails can be fastened, for example, to a body of a motor vehicle.

Bearing shells and centering elements for first longitudinal ends of the pressure vessels can form, in particular, locating bearings. As a result, an axial displacement of the pressure vessels is prevented at these locating bearings, the abovementioned movability in the longitudinal direction of the fastening rails, or else transversely with respect to the fastening rails, being maintained at the same time.

In particular, an upper second fastening rail can be arranged above second longitudinal ends of the pressure vessels, and a lower second fastening rail can be arranged below the second longitudinal ends of the pressure vessels. The bearing shells for holding the second longitudinal ends can be fastened both to the upper second fastening rail and to the lower second fastening rail. This enables mounting of second longitudinal ends, which can likewise be arranged adjacently with respect to one another, for example, in the case of adjacent pressure vessels, in a similar manner to that already described in relation to the first longitudinal ends.

Bearing shells and centering elements of the second longitudinal ends of the pressure vessels can form, in particular, floating bearings. Floating bearings of this type can enable, in particular, an axial movability of the respective held pressure vessel, with the result that a length compensation is enabled.

For example, a length compensation of this type can be required if the pressure vessel expands or contracts, for example, on account of pressure or temperature fluctuations.

One, some, or all second longitudinal ends can be configured, in particular, with axial play relative to the centering element. As a result, a floating bearing can be realized in an advantageous way.

The axial play can be configured, in particular, by virtue of the fact that the flat portion or the flat portions is/are of axially longer configuration than the surrounding centering element. This allows a simple realization of the axial play, without compromising the reliable mounting of the pressure vessel and the abovementioned movability.

The pressure container assembly can comprise, in particular, a plurality of pressure vessels, the longitudinal axes of which can be oriented parallel to one another. This allows an advantageous utilization of an installation space which is, for example, flat, for example, an underfloor space of a motor vehicle below a passenger cell. Underfloor spaces of this type can be provided, for example, in a motor vehicle to alternatively receive battery cells, or precisely a pressure vessel assembly depending on the desired specific embodiment. The use of a plurality of pressure vessels allows the respective pressure vessels to be of smaller configuration, in particular, to be configured with a smaller diameter, and nevertheless to achieve a high storage capacity for gaseous fuel with satisfactory installation space utilization.

In particular, directly adjacent pressure vessels can be at a smallest spacing from one another of between 2 mm and 4 mm. This has proven to be advantageous, since the pressure vessels do not make contact with one another in normal operation, but can be supported against one another in a suitable way for the case of a side impact event.

A smallest spacing can be, in particular, that spacing which is not undershot when a spacing of each position in the pressure vessel is determined by way of each position on another pressure vessel.

The flat portion can be oriented, in particular, parallel to the longitudinal axis of the pressure vessel. This allows a simple embodiment and definition of the displaceability. The same can apply to a further flat portion.

One, some, or all centering elements can be configured, in particular, to clamp one flat portion or two flat portions. This allows reliable holding of the respective pressure vessel.

In particular, one or more beads which are predetermined break points in the case of loading in the longitudinal extent can be configured in the one, some, or all fastening rails transversely with respect to the longitudinal extent of the fastening rail. Therefore, for the case of a load in the longitudinal extent, that is to say, for example, in the case of a side impact event, a defined fracture of the fastening rails can be enabled, as a result of which other, less desirable damage is prevented. In particular, the pressure vessel assembly can be installed in such a way that the longitudinal extent of the pressure vessels lies parallel to a motor vehicle longitudinal axis. Here, the motor vehicle longitudinal axis is typically that axis, in which the motor vehicle moves in the case of steered wheels which point straight ahead. A defined reaction of the fastening rails can be achieved, in particular in the case of side impact events, as a result of the above-described embodiment of the predetermined break points on the fastening rails which, in this case, are typically arranged transversely with respect to the longitudinal direction and horizontally in the motor vehicle.

Furthermore, a motor vehicle is described herein, comprising a pressure vessel assembly as described herein. Recourse can be made to all embodiments and variants described herein with regard to the pressure vessel assembly.

In other words, in the case of known pressure vessel assemblies in vehicles, they are typically configured with what is known as a neck mounting. Here, a metallic boss is typically clamped by way of two shell-shaped bearing shells. The bearing shells are screwed into further structures. In the case of positively locking clamping of the bearing shells, no movement of the container is permitted if used as intended. This can lead to problems during assembly in the form of tolerance fluctuations and, in the case of a fault, to overloading. If, for example, a pressure vessel is loaded transversely with respect to the axle as a result of a crash load, more or less great loads can occur at the interface between the boss and the CFRP (carbon fiber reinforced polymer) material, since flexural and transverse forces are introduced here. This region is relatively sensitive in comparison with the cylindrical part of the vessel.

In particular, bearing shells can therefore no longer be shell-shaped, but rather can be of linear or flat configuration. To this end, the boss is of flattened configuration on two sides which lie opposite one another. The boss can be clamped with a suitable force on these flat portions. The linear bearing elements can be extended in such a way that, in addition to the not yet flattened round region of the boss, suitable elastic or deformable jaw elements can be attached.

The latter can center the boss during assembly, but allow a certain tolerance orientation and displacement in the overloading case.

It can be provided, in particular, that linear clamping jaws permit a partial displacement of the tank mounting. The displacement range can be influenced by the length of the bearing shells. The design of the centering elements from, for example, elastomer or deformable plastic can influence the detaching force in the transverse direction. Detaching inhibition can also be achieved by way of suitable design of the clamping jaws with, for example, predetermined break elements. Different other bearing shapes for enclosing the flat boss regions (for example, C-shaped) are also conceivable. An upper shell and lower shell can be screwed in one step to the crossmembers. In one example, peak loads can be absorbed by way of displacement of the first pressure vessel or tank by 3 mm, for example. The pressure vessel then bears against the next pressure vessel, and the pure flexural loading can become somewhat lower again. Suitable run-on beads in the transverse profiles or fastening rails can lead to collapsing of the profiles in the case of further loading between the bearing points. Further pressure vessels can be loaded, it being possible first of all for the mount to slip and for repeated folding of the transverse profiles to then be achieved. Overall, further impact energy can be dissipated as a result. This can take place until all pressure vessels are in full contact and then bear against the sill which faces away from the impact. As a result of suitable adaptation of the useful width in the boss and the bearing shell, a suitable axial misalignment of the bosses between the pressure vessels can also be compensated for.

A pressure vessel assembly can be understood to be, in particular, one structural unit. It can comprise, in particular, pressure vessels together with permanently attached structural assistance, fastening and protective mechanisms (for example, shields, barriers, covers and coatings) which can be removed and reinstalled only using special tools and/or special methods, for example, for the purpose of maintenance or inspection.

The pressure vessel assembly can be provided, in particular, for a motor vehicle (for example, passenger motor cars, motorcycles, utility vehicles). The pressure vessel assembly can serve to store fuel which is gaseous under ambient conditions. The pressure vessel assembly can be used, for example, in a motor vehicle which is operated with compressed natural gas (CNG) or liquid natural gas (LNG) or with hydrogen. The pressure vessel assembly can be connected fluidically, in particular, to at least one energy converter which is configured to convert the chemical energy of the fuel into other energy forms.

A pressure vessel can be configured, for example, as a composite overwrapped pressure vessel. The pressure vessel can be, for example, a cryogenic pressure vessel or a high pressure gas vessel. In particular, the pressure vessels which are used herein can be Type IV pressure vessels. This can mean, in particular, that an inner supporting structure, in particular a liner, is wound with CFRP. The liner is typically configured from a thermoplastic. The pressure vessel can be closed at the ends by in each case one metallic "boss" which can likewise be wound with the CFRP. High pressure gas vessels are configured to store fuel at ambient temperatures in the long term at a nominal operating pressure (also called nominal working pressure (NWP)) of at least 350 barg (=positive pressure with respect to atmospheric pressure) or at least 700 barg. A cryogenic pressure vessel is suitable to store the fuel at the abovementioned operating pressures, even at temperatures which lie considerably (for example, more than 50 K or more than 100 K) below the operating temperature of the motor vehicles.

The pressure vessel assembly can be capable of being mounted, in particular, in an underfloor region below the passenger interior space of a motor vehicle. The longitudinal axes of the pressure vessels can run parallel to one another in the installed position and/or individual pressure vessels can each have a length-to-diameter ratio with a value between 4 and 200, preferably between 5 and 100, and particularly preferably between 6 and 50.

In one refinement, the pressure vessels are connected in parallel. A common distributor pipe can be provided here. The plurality of pressure vessels are as a rule connected directly to the distributor pipe, without a dedicated shut-off valve which is actuable electrically from the outside being provided in each case between the distributor pipe and the individual pressure vessels. The distributor pipe can serve to establish a fluidic connection to the individual pressure vessels. A combination of parallel and series connection is also possible.

An electrically actuable and normally closed shut-off valve can be provided on the distributor pipe and also on in each case each pressure vessel separately, which shut-off valve is configured to shut off the pressure vessel assembly or the distributor pipe with respect to the remaining fuel-conducting lines of the fuel supply system which leads to the energy converter. This shut-off valve can have the function of an on-tank valve of a conventional pressure vessel. Merely one normally closed shut-off valve is expediently provided. The shut-off valve can, for example, be capable of being screwed onto or into the distributor pipe directly. The shut-off valve is typically the first valve which is provided downstream of each of the pressure vessels which are connected to the common distributor pipe. A pipe burst safeguard (also called an excess flow valve) can be provided on each pressure vessel or on the distributor pipe.

BRIEF DESCRIPTION OF THE DRAWINGS

Embodiments will be described in the following text with reference to the appended figures, in which.

DETAILED DESCRIPTION OF THE DRAWINGS

Figures 1, 2:
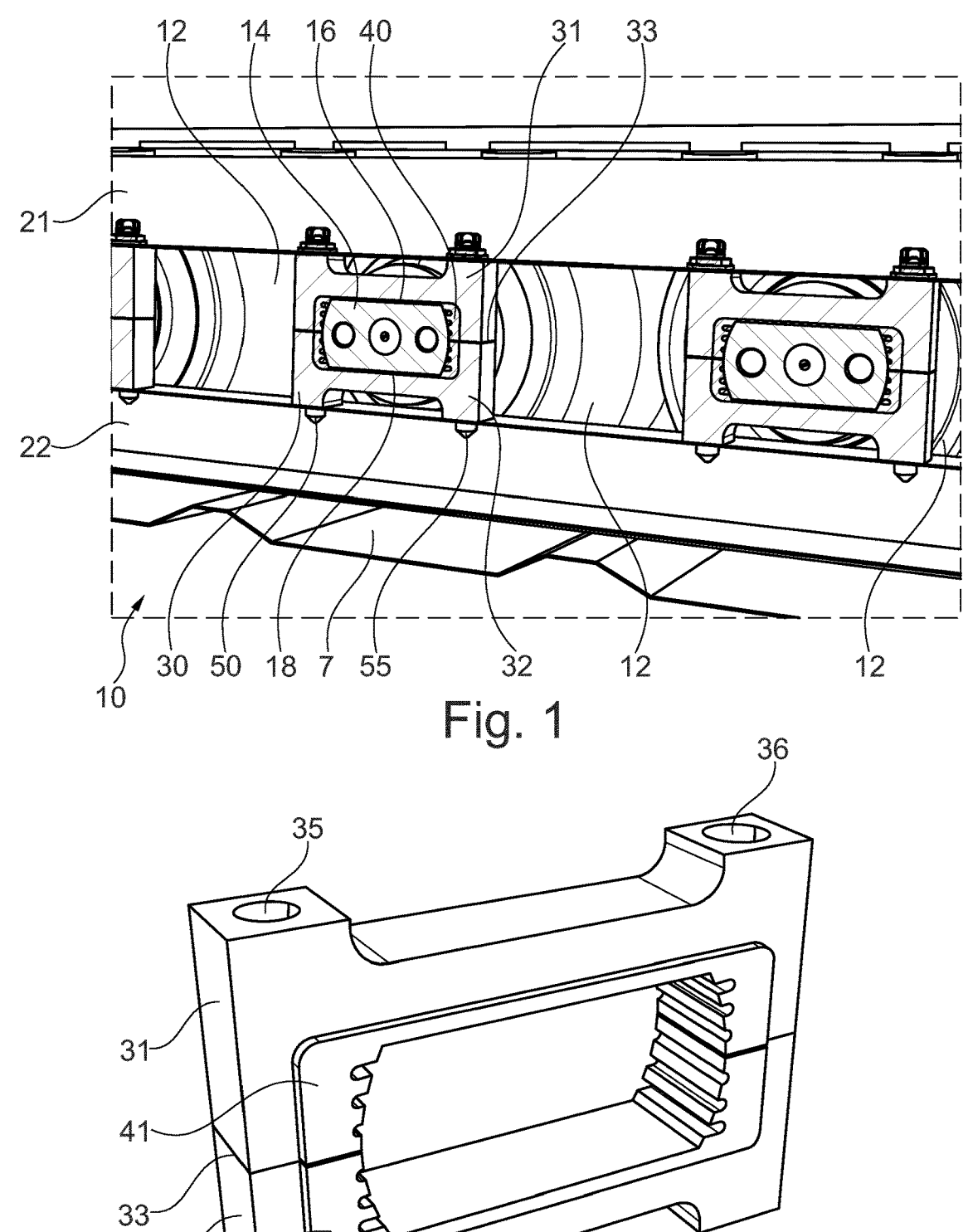
FIG. 1 shows a pressure vessel assembly.
FIG. 2 shows a part of the pressure vessel assembly.

FIG. 1 diagrammatically shows a part of a pressure vessel assembly 10 in accordance with one exemplary embodiment. The pressure vessel assembly 10 has a plurality of pressure vessels 12, of which three can be seen in the details shown in FIG. 1. They have parallel longitudinal axes.

Longitudinal ends 14 of the pressure vessels 12 are held as shown and as described in the following text.

The pressure vessel assembly 10 has an upper fastening rail 21 and a lower fastening rail 22. The two fastening rails 21, 22 are oriented parallel to one another, it being possible for them to be installed in a typical installation situation of the pressure vessel assembly 10, for example, transversely with respect to a longitudinal direction of the motor vehicle.

Each longitudinal end 14 is held by a respective centering element 40, the centering element 40 being installed in the respective bearing shell 30. The bearing shell 30 is screwed via a first bolt 50 and a second bolt 55 onto the fastening rails 21, 22. The respective bearing shell 30 has a first part 31 and a second part 32, between which a dividing line 33 is configured. Here, the first part 31 is arranged above the second part 32. As a result, fastening of the bearing shell 30 to the fastening rails 21, 22 is facilitated.

Each longitudinal end 14 of the pressure vessel 12 has an upper flat portion 16 and a lower flat portion 18. They lie parallel to the fastening rails 21, 22. They are held by the respective centering element 40 in such a way that the parallelism is ensured.

In the present case, the pressure vessel assembly 10 is arranged above a floor panel 7. This floor panel 7 can delimit a motor vehicle toward the bottom, for example. It can delimit, in particular, an installation space below a passenger cell of a motor vehicle on the lower side.

FIG. 2 shows a bearing shell 30 and the centering element 40 which is situated in it, in greater detail. It can be seen here that a first through bore 35 and a second through bore 36, through which the abovementioned bolts 50, 55 pass, are configured in the bearing shell 30. The centering element 40 is likewise divided into two parts 41, 42 which are arranged above one another. In the present case, the centering element 40 is configured from a rubber material which is elastic. As a result, the respective longitudinal end 14 of the pressure vessel 12 can be held in such a way that the abovementioned parallelism of the flat portions 16, 18 with respect to the fastening rails 21, 22 is defined, but at the same time, a limited movability of the respective longitudinal end 14 relative to the bearing shell 30 and therefore also relative to the fastening rails 21, 22 is enabled. This limited movability which is possible both vertically and horizontally enables partial yielding of the respective pressure vessel 12 against pressure which acts from the side, for example, in the case of side impact events. As a result, damage of the pressure vessel 12 can be prevented effectively in situations of this type.

Figure 3:
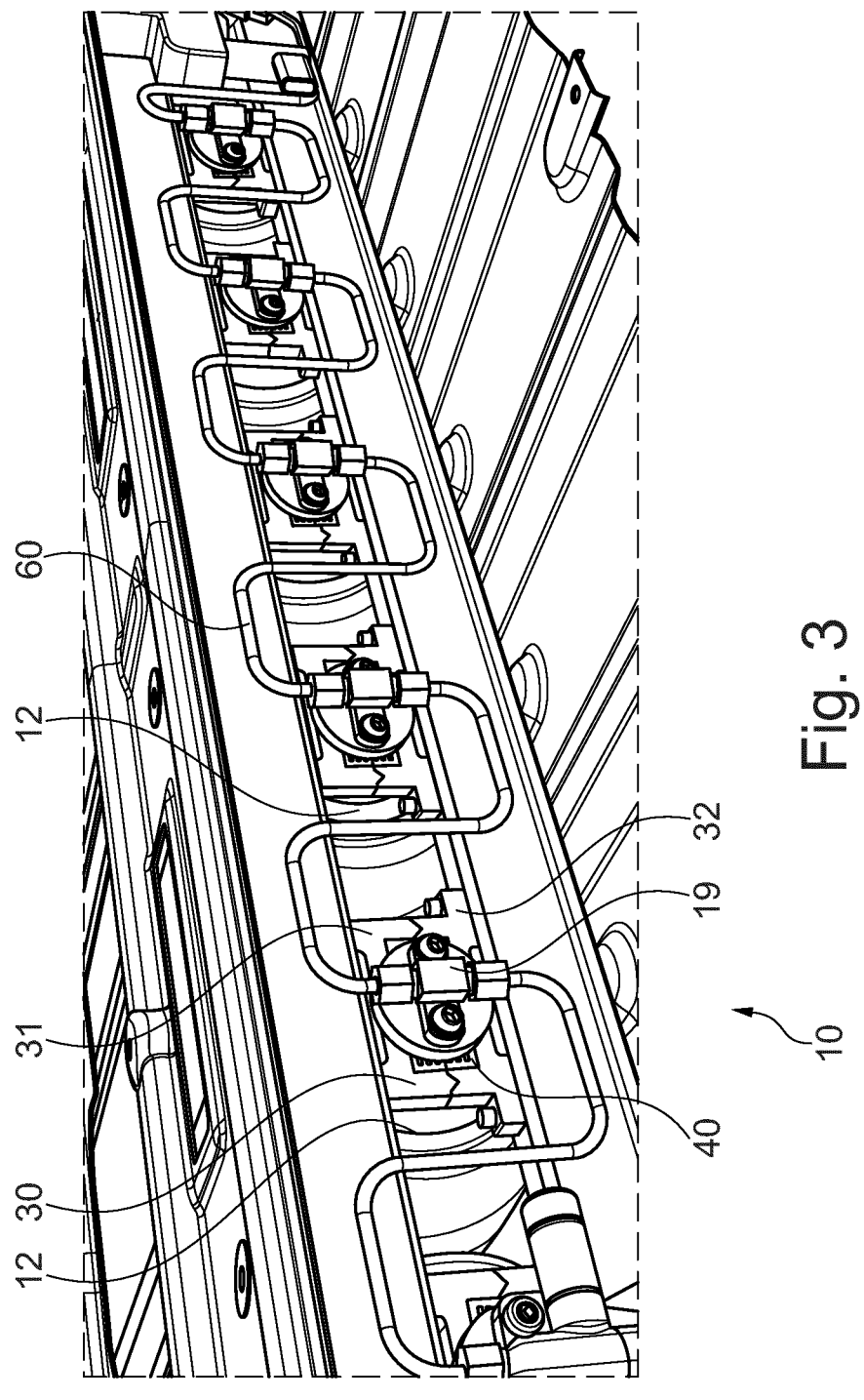
FIG. 3 shows an interconnection of pressure vessels in a pressure vessel assembly.

FIG. 3 shows a pressure vessel assembly 10, in the case of which the pressure vessels 12 are connected to a common connector line 60. The connector line 60 is connected to respective connecting pieces 19 of the pressure vessels 12 and connects the pressure vessel 12 in such a way that they can be filled with gaseous fuel, and this gaseous fuel can also be drawn off from them again. Here, no valve is typically provided between the respective pressure vessel 12 and the connector line 60, with the result that common filling and common drawing off are possible. To this end, for example, a common tank shut-off valve (not shown) can be used. As an alternative, however, respective vessel valves can also be provided, in order to enable separate switching of each pressure vessel 12.

Figure 4:
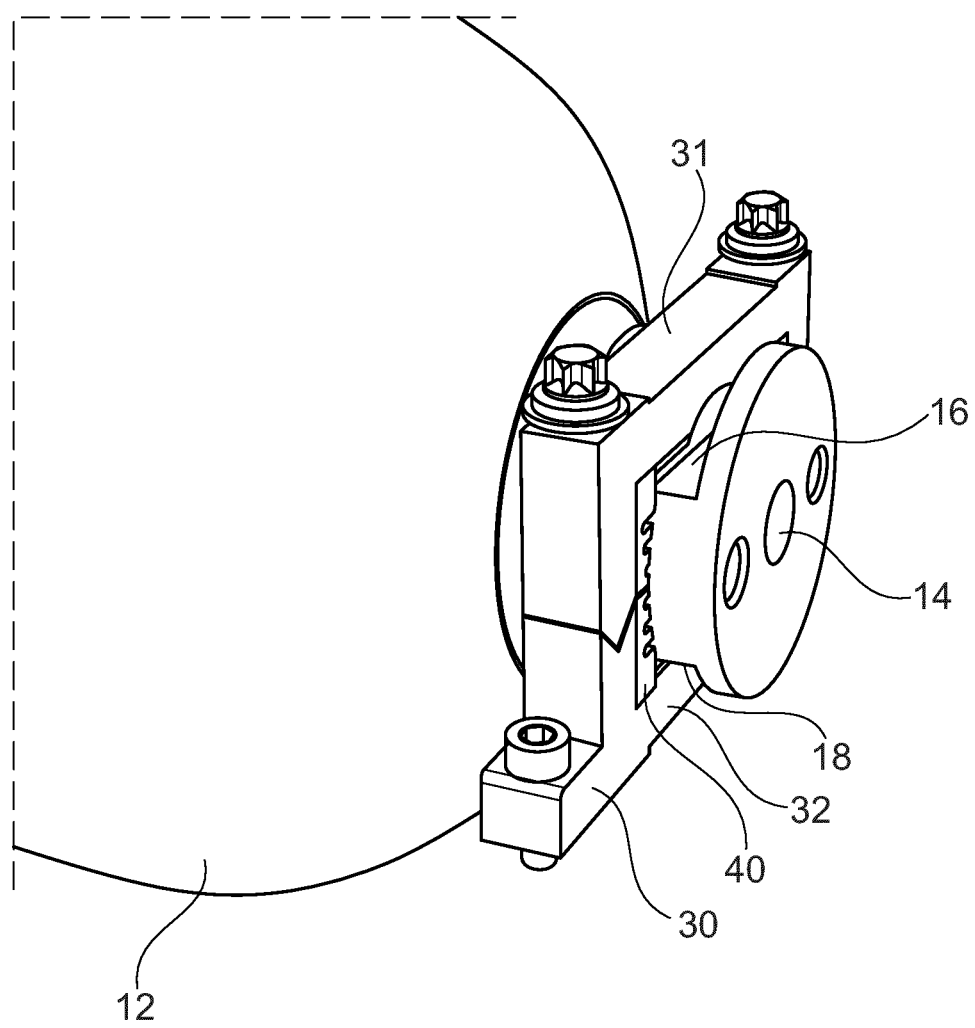
FIG. 4 shows one embodiment of a floating bearing.

FIG. 4 shows one embodiment of the described mount as a floating bearing. It can be seen here that the two flat portions 16, 18 are of axially longer configuration than the bearing shell 30 and the centering element 40. As a result, an axial play is enabled which can be used, for example, to compensate for length changes of the pressure vessel 12 on account of pressure or temperature fluctuations. A locating bearing can be configured in a simple way by way of shortening of the flat portions 16, 18 in the axial direction, in such a way that boundaries bear directly against the bearing shell 30. In particular, in the case of a pressure vessel assembly 10, floating bearings can be used on one side of the pressure vessels 12 and locating bearings can be used on one side of the pressure vessels 12, with the result that only play which is required for a floating bearing functionality is present on one side, but defined mounting is possible on the other side. A common connector line 60, as can be seen in FIG. 3, is typically attached to one side of the pressure vessels 12, which is held by locating bearings.

For reasons of readability, the term "at least one" has been partially omitted in a simplifying manner. If a feature is described in the single or with an indefinite article (for example, the/pressure vessel, these/bearing shell, etc.), a plurality thereof is also intended to be disclosed at the same time (for example, the at least one pressure vessel, the at least one bearing shell, etc.).

The preceding description of the present disclosure serves only for illustrative purposes and not for the purposes of restricting the disclosure. Different amendments and modifications are possible within the context of the disclosure, without departing from the scope of the disclosure and its equivalents.

LIST OF DESIGNATIONS

7 Floor panel
10 Pressure vessel assembly
12 Pressure vessel
14 Longitudinal end
16 Flat portion
18 Flat portion
21 Fastening rail
22 Fastening rail
30 Bearing shell
31 First part
32 Second part
33 Dividing line
35, 36 Through bores
40 Centering element
41 First part
42 Second part
50, 55 Bolts
60 Connector line

What is claimed is:

1. A pressure vessel assembly for an underfloor space of a motor vehicle, comprising:
   a plurality of pressure vessels,
   one or more fastening rails,
   a plurality of bearing shells, the bearing shells being fastened to the one or more fastening rails, and
   a plurality of centering elements,
   wherein one longitudinal end of one, some, or all pressure vessels has at least one flat planar portion and is held by a centering element in a bearing shell, the flat planar portion having an angle of 5° with respect to the fastening rail to which the bearing shell is fastened,
   wherein the centering element enables a limited relative movement of the longitudinal end of the pressure vessel relative to the fastening rail at least parallel to the fastening rail, and one, some, or all centering elements being configured from an elastic material, and,
   wherein a further flat planar portion which is parallel to the flat planar portion is configured at one, some, or each longitudinal end in an opposed manner with respect to the flat planar portion.

2. The pressure vessel assembly according to claim 1, wherein the pressure vessels are connected in parallel, and a common distributor pipe is provided, to which the plurality of pressure vessels are connected directly, without a shut-off valve being provided in each case between the distributor pipe and the individual pressure vessels.

3. The pressure vessel assembly according to claim 1, wherein one, some, or all bearing shells are divided into a first part and a second part.

4. The pressure vessel assembly according to claim 3, wherein a dividing line between a first part and a second part is parallel to the flat planar portion.

5. The pressure vessel assembly according to claim 1, wherein one, some, or all centering elements enable a limited relative movement of the longitudinal end of the pressure vessel relative to the fastening rail transversely with respect to the fastening rail.

6. The pressure vessel assembly according to claim 1, wherein the pressure vessels are installed transversely with respect to a longitudinal direction of the motor vehicle.

7. The pressure vessel assembly according to claim 1, wherein some or all centering elements have one or more predetermined break points in order to enable the relative movement.

8. The pressure vessel assembly according to claim 1, wherein one, some, or all centering elements hold the flat planar portion parallel to the fastening rail.

9. The pressure vessel assembly according to claim 1, wherein one, some, or all bearing shells are fastened via one, two or more screwed bolts to one, two, or more fastening rails.

10. The pressure vessel assembly according to claim 1, wherein an upper first fastening rail is arranged above first longitudinal ends of the pressure vessels, and a lower first fastening rail is arranged below the first longitudinal ends of the pressure vessels, the bearing shells for holding the first longitudinal ends being fastened both to the upper first fastening rail and to the lower first fastening rail.

11. The pressure vessel assembly according to claim 1, wherein bearing shells and centering elements for first longitudinal ends of the pressure vessels form locating bearings.

12. The pressure vessel assembly according to claim 1, wherein an upper second fastening rail is arranged above second longitudinal ends of the pressure vessels, and a lower second fastening rail is arranged below the second longitudinal ends of the pressure vessels, the bearing shells for holding the second longitudinal ends being fastened both to the upper second fastening rail and to the lower second fastening rail.

13. The pressure vessel assembly according to claim 1, wherein bearing shells and centering elements for second longitudinal ends of the pressure vessels form floating bearings.

14. The pressure vessel assembly according to claim 12, wherein one, some, or all second longitudinal ends are configured with axial play relative to the centering element.

15. The pressure vessel assembly according to claim 14, wherein the axial play is configured by virtue of the fact that the flat planar portion or the flat planar portions is/are of axially longer configuration than the surrounding centering element.

16. The pressure vessel assembly according to claim 1, wherein the longitudinal axes of a plurality of pressure vessels are oriented parallel to one another.

17. The pressure vessel assembly according to claim 16, wherein immediately adjacent pressure vessels are at a smallest spacing from one another of between 2 mm and 4 mm.

18. The pressure vessel assembly according to claim 1, wherein the flat planar portion is oriented parallel to the longitudinal axis of the pressure vessel.

19. The pressure vessel assembly according to claim 1, wherein one, some, or all centering elements are configured to clamp at least one flat planar portion.

20. The pressure vessel assembly according to claim 1, wherein one or more beads at predetermined break points in a case of loading in a longitudinal extent are configured transversely with respect to the longitudinal extent of the fastening rail in one, some, or all fastening rails.

21. A motor vehicle, comprising a pressure vessel assembly according to claim 1.

* * * * *